Oct. 21, 1941.     R. A. BRADEN     2,259,549
SUPERREGENERATIVE MAGNETRON RECEIVER
Original Filed Jan. 31, 1938     3 Sheets-Sheet 1
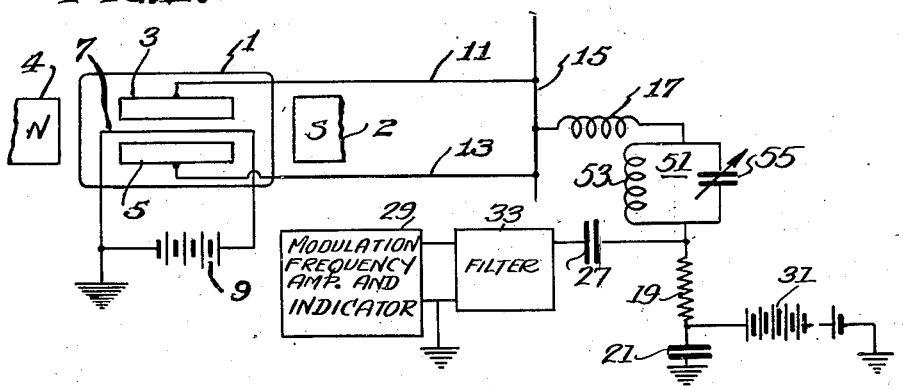
Fig. 1.
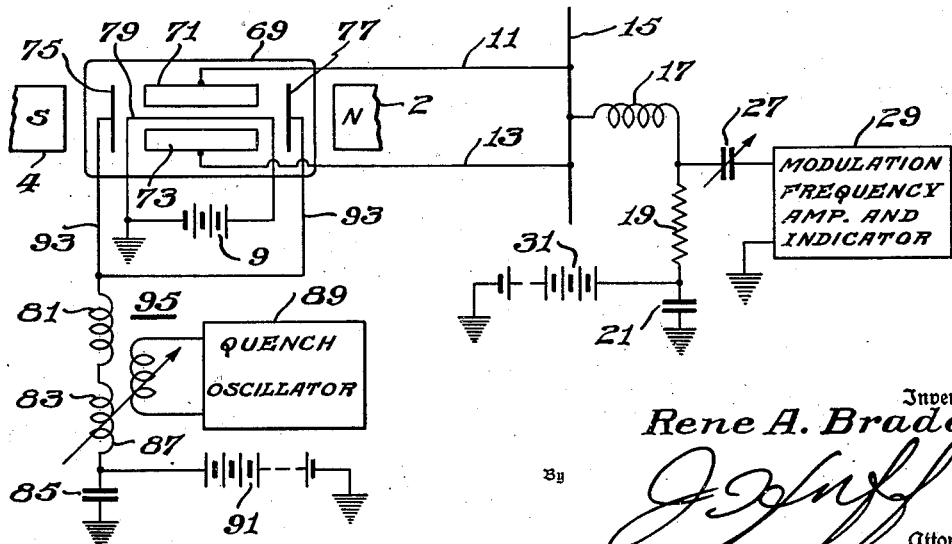
Fig. 2.
Inventor
Rene A. Braden
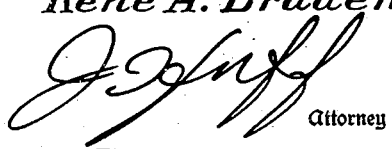
Attorney

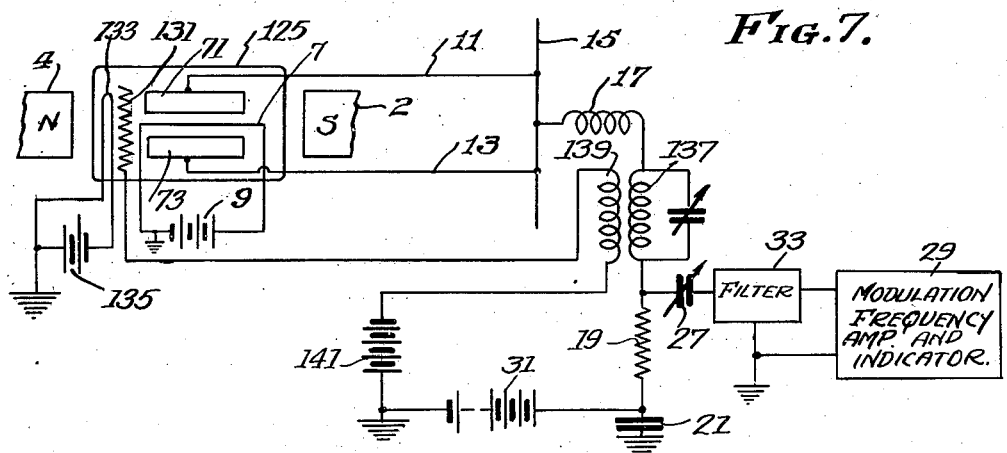
FIG. 7.
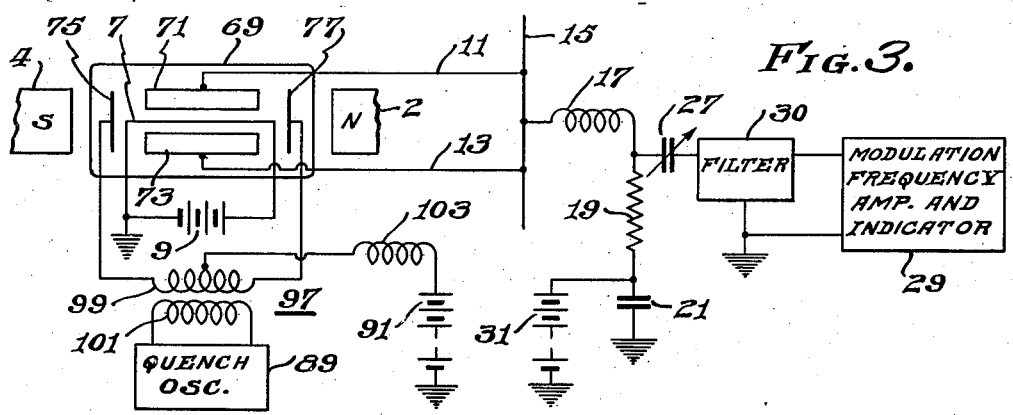
FIG. 3.
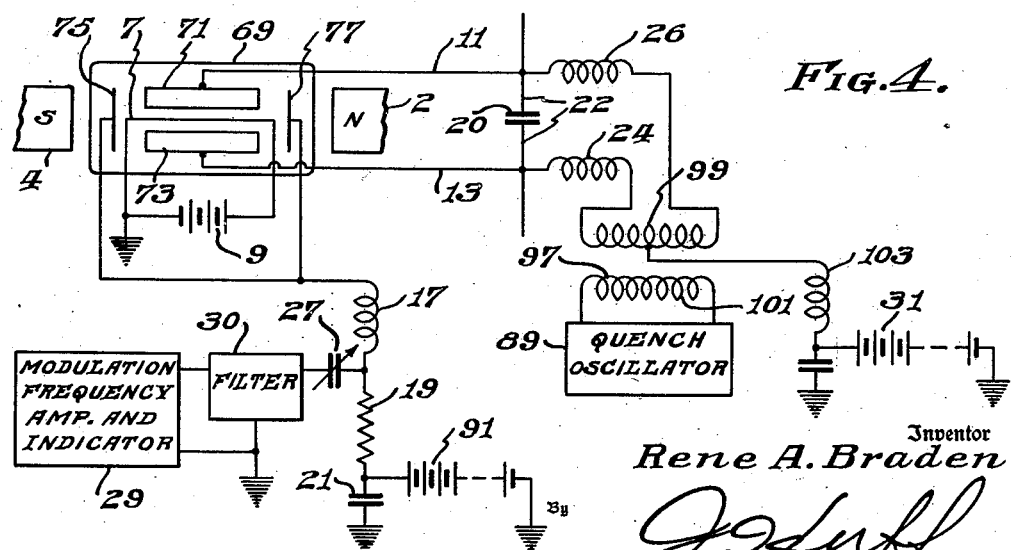
FIG. 4.
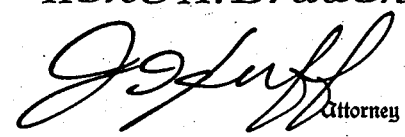
Inventor
Rene A. Braden
Attorney

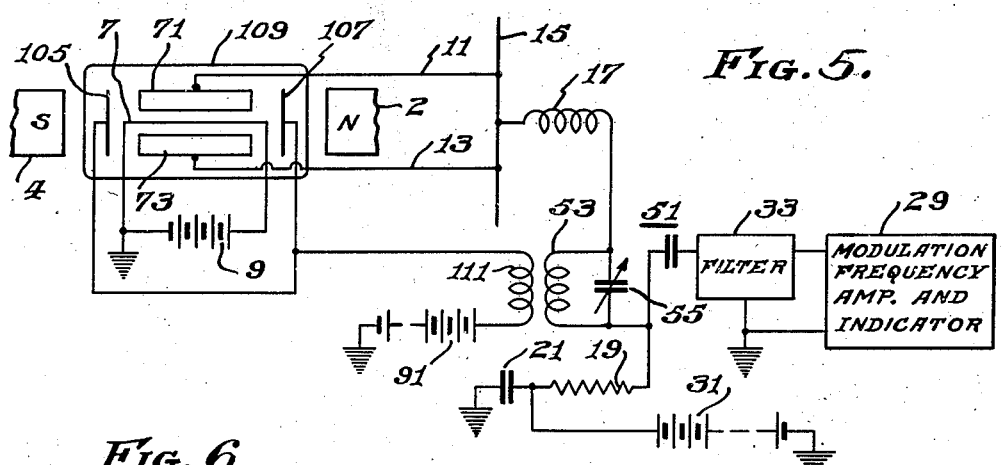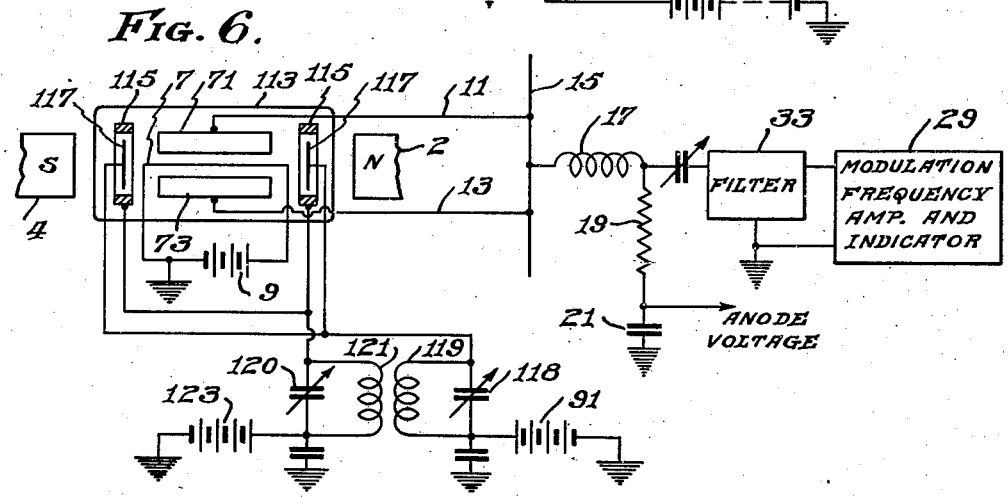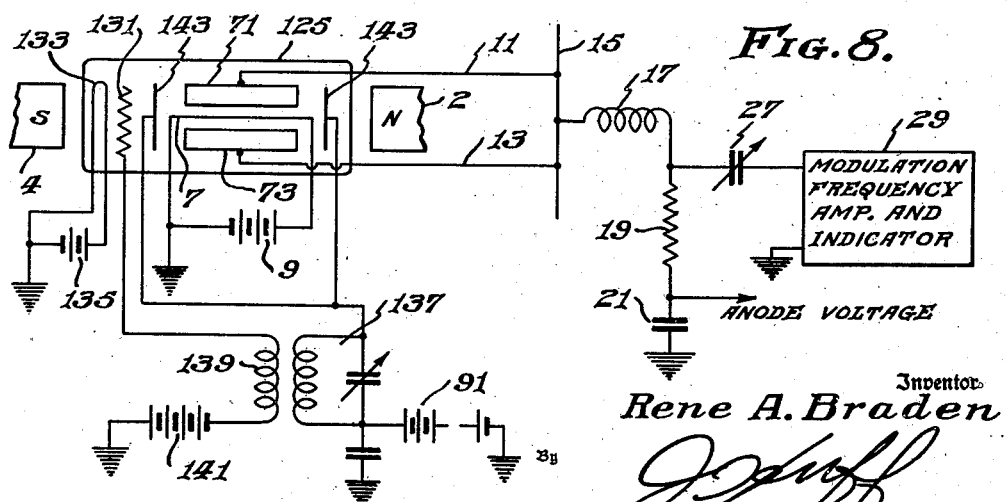

Patented Oct. 21, 1941

2,259,549

UNITED STATES PATENT OFFICE 2,259,549

SUPERREGENERATIVE MAGNETRON RECEIVER

Rene A. Braden, Collingswood, N. J., assignor to Radio Corporation of America, a corporation of Delaware Original application January 31, 1938, Serial No. 187,942. Divided and this application February 29, 1940, Serial No. 321,550

8 Claims. (Cl. 250—20)

My invention relates to ultra short wave receivers, and more particularly to a receiver having a superregenerative magnetron detector.

This application is a division of my copending application Serial No. 187,942, filed January 31, 1938, for Superregenerative magnetron receiver granted August 13, 1940, as U. S. Patent No. 2,211,091.

The practice of superregeneration as applied to thermionic detectors operating in the usual range of radio signalling frequencies is well known. I have discovered that the conditions causing superregeneration which results in the increased sensitivity of an oscillating detector can be applied to a magnetron. Essentially these conditions are met by a detector which is capable of self-oscillation when suitable values of electrode potentials are applied and in which oscillations are interrupted by periodic variations of the electrode potentials.

It is an object of this invention to provide means for obtaining superregeneration in a magnetron.

In its simplest form, a magnetron detector is essentially a two-electrode device. In consequence, the signal input circuit, the quench voltage circuit, and the modulation frequency output circuit are all attached to the same pair of electrodes. This results in the direct application of quench voltages to the modulation frequency amplifier. The amplifier is consequently overloaded so that it does not effectively amplify the demodulated signal.

It is therefore a further object of my invention to provide means for protecting the modulation frequency amplifier of a superregenerative magnetron detector from being overloaded by the quench frequency oscillations.

Another object is to provide means for generating quenching voltages in a magnetron oscillator.

A further object is to provide means for applying quenching voltages to magnetrons having auxiliary electrodes.

My invention will be better understood from the following description when considered in connection with the accompanying drawings. Its scope is indicated by the appended claims.

Referring to the drawings,

Figure 1 is a circuit diagram of a magnetron detector in which a negative resistance characteristic of a magnetron is used to provide self-excited quench oscillations;

Figure 2 represents a superregenerative end-plate magnetron detector in which an in-phase quenching voltage is applied to the end-plates;

Figure 3 is the same as Fig. 2 except that an out-of-phase quenching voltage is applied to the end-plates;

Figure 4 is another circuit for quenching an end-plate magnetron detector and for protecting the modulation frequency amplifier from the quench frequency voltages.

Figure 5 is a schematic diagram of a self-excited end-plate magnetron detector, in which the end-plates are used to obtain feedback for generating quench frequency voltages;

Figure 6 is a schematic diagram of a double end-plate magnetron in which the end-plates constitute the quench frequency oscillating electrodes;

Figure 7 is a schematic diagram of an alternative type of magnetron detector in which a second emissive cathode and a grid provide regenerative feedback to the anodes for the generation of quench frequency oscillations;

Figure 8 is a schematic diagram of a split-anode magnetron detector in which quench frequency oscillations are generated in auxiliary electrodes.

Similar numerals refer to similar parts throughout the several drawings.

Referring to Fig. 1, a split anode magnetron tube is shown at 1 having anodes 3 and 5, emissive cathode 7 heated by a battery 9, one terminal of which is grounded. A magnetic field parallel to the cathode is indicated by the pole pieces 2 and 4 of a magnet which is not shown. A tunable transmission line 11, 13 connects the anodes to a dipole antenna 15. Tuning is accomplished by varying the length of 11 and 13. The midpoint of the antenna is serially connected to the positive terminal of a potential source, such as battery 31, through a choke coil 17, a tuned circuit 51 and a resistor 19. The battery 31 has its negative terminal grounded, and may be by-passed by a capacitor 21.

Ultra short wave signals are received on the antenna 15, and fed to the magnetron anodes through the transmission line. A voltage corresponding to the modulation of the received signal is developed across the resistor 19 by the detection which occurs in the magnetron. This voltage is then impressed on the modulation frequency amplifier and indicator 29 through the filter 33.

The quench voltage is usually comparatively high. Should it be impressed directly across the amplifier, the grid of the first amplifier tube would be driven positive during a portion of the cycle, and below negative cut-off during a portion of the cycle. This would cause distortion, a reduction of gain, or complete blocking of the amplifier. The purpose of the filter 33 is to prevent the quench frequency voltage from reaching the amplifier 29. The filter may be designed in the usual manner to provide low pass characteristics for audio modulations, or band pass characteristics for high frequency modulations. In either case it should present a high degree of attenuation to the quench frequency voltage.

Self-generated quench oscillations are produced in the anode circuit of the tube. A shunt resonant circuit 51, comprising an inductor 53 and a capacitor 55, is inserted in the anode lead to the magnetron between resistor 19 and choke 17. By virtue of the negative resistance characteristic of the magnetron, quenching oscillations are generated whose frequency is determined by the resonant frequency of the resonant circuit 51. These quenching oscillations occur simultaneously with the ultra short wave oscillations and, as a result, the anode potential is varied, interrupting the latter oscillations at the frequency of the former. Increased sensitivity due to the superregenerative action results.

Fig. 2 illustrates an embodiment of my invention in which the quenching voltage is applied to the end plates of an end-plate magnetron 69. Two anode sections 71 and 73 are connected to the antenna 15 through the transmission line 11, 13. The mid-point of the antenna is connected to the positive terminal of the anode voltage supply through choke 17 and resistor 19. The demodulated output is taken from the junction of choke 17 and resistor 19 through capacitor 27. The two end plates 75 and 77 are connected together by leads 93 and to the positive terminal of a battery 91 through a choke 81 and the secondary 83 of a transformer 95. The quenching voltage is then induced in series with the fixed potential from 91 by the oscillator 89 and transformer 95. Since an increase in end-plate potential causes an increase in end-plate current and a decrease in anode current, and vice versa, the quenching frequency may also appear in the modulation frequency amplifier. Precautions must be taken to prevent this. The use of a suitable filter has been explained in the parent application referred to above.

Fig. 3 shows a method of protecting the modulation frequency amplifier from the quench voltage which has particular application to an end-plate magnetron. Except for the end-plate connections, the usual magnetron circuit is shown. The quenching voltage from the oscillator 89 is applied through a push-pull transformer 97 out of phase to the two end plates 75 and 77. The mid-point of the secondary 99 of this transformer is connected through a choke 103 to the positive terminal of the source of end-plate potential 91. Consequently, at any instant the modulating effect of one plate on the anode current is partially cancelled by the equal and opposite effect of the other end plate. At the same time the signal frequency oscillations are interrupted twice in each quench frequency cycle. A voltage of twice the quench frequency appears across resistor 19, but its amplitude is not as great as that of the fundamental quench frequency. A further advantage is derived from the increased separation between the signal modulation frequencies and the quench frequency. A filter may be designed to separate more efficiently the desired signal from the undesired when the difference between them is great.

I have found that other combinations are possible; for example, the quench voltage may be applied to the anode, and the demodulated signal taken from the end plates, as shown in Fig. 4. This capacitor presents negligible impedance to signal frequencies, but a high impedance to quench frequencies. Two choke coils 24 and 26 are provided through which the out-of-phase quench voltage is applied to anodes 71 and 73 from the secondary 99. A voltage of twice the quench frequency appears across resistor 19 as in Fig. 3, and similarly may be attenuated by a filter 30.

Other combinations which may be employed include applying the quenching voltage simultaneously in opposite phase to the two end plates, and to the two split anodes in proper magnitude and phase to effect a balance with respect to the total current to the split anodes. Or the signal may be applied to either pair of electrodes in phase, and the detected signal taken out of the remaining pair, in phase.

Figure 5 is a schematic diagram of another method of obtaining superregenerative detection with an end plate magnetron. A regenerative feedback coupling to the end plates 105 and 107 has been provided which includes the mutual coupling between inductor 53, which is in the anode circuit, and inductor 111, which is connected between the end plates and the end-plate battery 91. One, or both, of these inductors may be tuned by a variable capacitor. When the magnetic coupling between inductor 111 and inductor 53 is properly phased, quenching oscillations will be generated at a frequency which is determined by the resonant frequency of one, or both, of the tuned circuits. As before, the variation of anode potential interrupts the ultra short wave oscillations at the quench frequency, and superregenerative detection results.

In Fig. 6 is shown a superregenerative magnetron detector circuit which employs a magnetron 113 having an additional electrode associated with each end plate which is preferably an annular electrode 115. The end-plate battery 91 supplies a positive potential to both end plates 117 through an inductor 119. A battery 123 supplies a negative potential to the electrodes 115 through an inductor 121 inductively coupled to 119. One or both of these inductors may be tuned, as by capacitors 118 and 120. Quench oscillations are generated between these electrodes at the resonant frequency of one, or both, of the tuned circuits. The varying potential on the end plates 117 interrupts the signal frequency oscillations of the magnetron to produce superregeneration. While the annular electrodes 115 have been shown concentric to and in the plane of the end plates 117, they are not limtied to that position, nor indeed are they to be limited to the annular shape illustrated. They may take the form of grids and be placed, for example, between the end plates 117 and the anodes 71, 73.

A further variation of the method of obtaining quenching oscillations is shown in Fig. 7. A split anode magnetron 125 is provided with a second emissive cathode 133 and a grid 131. The grid is negatively biased by a battery 141 and coupled to the anode circuit through inductor 139 coupled to a shunt tuned circuit 137 in the anode circuit. The cathode 133, the grid 131 and the anodes 71, 73 function as a triode thermionic tube. Regenerative feedback at the quench frequency is produced by the proper phasing of the coupled circuits 139 and 137, and quenching oscillations are produced at a frequency determined by 137. This, again, results in a variation of the anode potential which quenches the signal frequency oscillation to produce superregeneration.

Fig. 8 shows a still further variation in which two end plates 143 are added to the magnetron of Fig. 7. The resonant circuit 137 is now in series with the end-plate potential source 91, and is coupled to a grid inductor 139. The second cathode 133, grid 131 and end plates 143 perform thermionic triode functions to generate quench frequency oscillations. The modulation frequency output is taken from the anodes in the usual manner.

I have thus shown how the sensitivity of an ultra short wave magnetron detector may be greatly increased by an application of the principles of superregeneration, and I have shown how the quenching oscillations may be generated by the magnetron tube itself, and I have shown various methods of protecting the audio system from the effect of excessive quench frequency voltages.

I claim as my invention:

1. The combination including means receptive to radio frequency signals, an oscillating magnetron detector having a cathode, one or more anodes, and one or more end plates, means for impressing said signals on said magnetron anodes, and means including said end plates for interrupting said oscillations whereby superregenerative detection is established.

2. In an ultra short wave receiver including an oscillating magnetron detector having a cathode, one or more anodes and a plurality of end plates, and means associated with said anodes for indicating demodulated signal impulses, means for periodically interrupting said magnetron oscillations including a source of alternating potential of interruption frequency, and means for impressing said alternating potentials on said end plates in phase opposition whereby superregenerative detection takes place.

3. A system comprising means receptive to modulated radio frequency signals, a magnetron device oscillating at said radio frequency having a cathode, one or more anodes, at least one end plate and at least one auxiliary electrode, means for impressing said radio frequency signals on said anodes, means for generating local oscillations having a frequency lower than said radio frequency oscillations, said means including a first inductor associated with said end plates, a second inductor associated with said auxiliary electrode magnetically coupled to said first inductor, and means for resonating at least one of said inductors, whereby local oscillation takes place between said end plate and said auxiliary electrode, at a frequency determined by said resonant inductor, said local oscillation having sufficient magnitude to interrupt said radio frequency oscillations, whereby superregenerative detection takes place.

4. In an ultra short wave receiver including a magnetron detector having a first cathode, one or more anodes, a second cathode, and a grid, means including said first cathode and said anodes for producing signal frequency oscillations, means including said second cathode, grid, anodes, and an inductor associated with said grid coupled to a resonant circuit associated with said anodes, whereby local oscillations are generated, whose frequency is determined by said resonant circuit, said local oscillations interrupting said signal frequency oscillations thereby producing superregenerative detection in said magnetron.

5. A device of the character in claim 2 which is further characterized by means for preventing oscillations of twice said interruption frequency from being impressed on said indicating means.

6. In an ultra short wave receiver including a magnetron detector connected to a source of energizing potential and oscillating at signal frequency, the method of utilizing the negative resistance characteristic of said magnetron which includes the steps of generating a quench frequency potential by a shunt resonant circuit, serially connected between said energizing potential source and said magnetron detector and tuned to a frequency lower than said signal frequency, and interrupting said magnetron signal frequency oscillations by said quench frequency potential to produce superregeneration.

7. The combination including means receptive to radio frequency signals, an oscillating magnetron detector having a cathode, one or more anodes, and one or more end plates, means for impressing said signals on said magnetron anodes, a source of interruption frequency oscillations, and means for varying the potential of said end plates with respect to ground in accordance with said oscillations.

8. The combination including means receptive to radio frequency signals, an oscillating magnetron detector having a cathode, one or more anodes, and one or more end plates, means for impressing said signals on said magnetron anodes, a source of interruption frequency oscillations, and means for varying the potential of said end plates in phase with respect to ground in accordance with said oscillations.

RENE A. BRADEN.